(12) United States Patent
Baba et al.

(10) Patent No.: US 6,203,945 B1
(45) Date of Patent: Mar. 20, 2001

(54) NICKEL HYDROXIDE ACTIVE MATERIAL FOR USE IN ALKALINE STORAGE CELL AND MANUFACTURING METHOD OF THE SAME

(75) Inventors: Yoshitaka Baba; Motoo Tadokoro; Takayuki Yano, all of Itano-gun (JP)

(73) Assignee: Sanyo Electric Co., Ltd., Osaka-fu (JP)

(*) Notice: Subject to any disclaimer, the term of this patent is extended or adjusted under 35 U.S.C. 154(b) by 0 days.

(21) Appl. No.: 09/109,070

(22) Filed: Jul. 2, 1998

(30) Foreign Application Priority Data

Jul. 4, 1997 (JP) .................................................. 9-179941

(51) Int. Cl.⁷ .................................................. H01M 4/32
(52) U.S. Cl. .............................................. 429/223; 423/594
(58) Field of Search ........................... 429/223; 423/594; 205/60; 252/521.2

(56) References Cited

U.S. PATENT DOCUMENTS

| | | |
|---|---|---|
| 4,312,928 | 1/1982 | Van Deutekom . |
| 5,348,822 | * 9/1994 | Ovshinsky et al. .................. 429/223 |
| 5,629,111 | 5/1997 | Yamawaki et al. . |
| 5,672,447 | 9/1997 | Yamawaki et al. . |
| 5,688,616 | 11/1997 | Yamawaki et al. . |
| 5,691,086 | 11/1997 | Baba et al. . |
| 5,702,762 | 12/1997 | Baba et al. . |

FOREIGN PATENT DOCUMENTS

| | | |
|---|---|---|
| 59-016269 | 1/1984 | (JP) . |
| 08148145 | 6/1996 | (JP) . |
| 08148146 | 6/1996 | (JP) . |

OTHER PUBLICATIONS

Ezhov et al, "Structure Modification and Change of Electrochemical Activity of Nickel Hydroxides", Electrochemical Science and Technology Technical Papers, vol. 138, No. 4, Apr. 1991, published by The Electrochemical Society Inc.

* cited by examiner

Primary Examiner—Carol Chaney
Assistant Examiner—Susy Tsang
(74) Attorney, Agent, or Firm—Nixon & Vanderhye

(57) ABSTRACT

A nickel hydroxide active material for use in an alkaline storage cell, the active material being essentially composed of nickel hydroxide particles covered with a cobalt compound adhered to their surfaces, wherein the cobalt compound is disordered in a crystal structure and formed in a higher order state containing alkali cation, and wherein the nickel hydroxide is in the form of a higher order nickel compound having an average oxidation value of 2.15 to 2.40.

6 Claims, 1 Drawing Sheet

NICKEL HYDROXIDE ACTIVE MATERIAL FOR USE IN ALKALINE STORAGE CELL AND MANUFACTURING METHOD OF THE SAME

BACKGROUND OF THE INVENTION

1. Field of the Invention

The present invention relates to a nickel hydroxide active material for use in an alkaline storage cell such as a nickel-hydrogen storage cell, a nickel-cadmium storage cell, a nickel-zinc storage cell or the like and a manufacturing method of the same. More particularly, the present invention relates to a nickel hydroxide active material containing a cobalt compound as a conductive agent and a manufacturing method of the same.

2. Description of the Prior Art

In recent years, demands of a high performance storage cell have increased in rapid popularization of portable electronic and communication equipments. In the field of alkaline storage cells, there have been proposed various improvements of a nickel hydroxide active material adapted for use in the alkaline storage cell. For example, Japanese Patent Laid-open Publication No. 59-16269 discloses a method for forming nickel hydroxide with oxidizer in a higher order state. When the nickel hydroxide is formed in a higher order state, nickel hydroxide powder of higher density can be obtained. In the case that the nickel hydroxide powder of higher density is used as an active material, the density of the active material in a substrate of a nickel positive electrode can be increased to enhance the energy density of the nickel positive electrode.

Although the foregoing method is theoretically effective to increase the capacity of the nickel positive electrode, it is difficult to obtain oxy-nickel hydroxide of the β-type (β-NiOOH: 19.8 cm$^3$/mol) in a crystal state of higher density in volume desirable in electrochemical characterstic. As a result, oxy-nickel hydroxide of the γ-type (γ-NiOOH: 30.6 cm$^3$/mol) in a crystal state of lower density in volume undesired as an active material of the nickel positive electrode is produced, and the nickel hydroxide particles are oxidized only at their surfaces. It is, therefore, difficult to adjust the oxidation degree of nickel hydroxide particles. In addition, the oxidizer remains in the nickel hydroxide active material, causing undesired influence to the performance of the storage cell.

To avoid the problems discussed above, there has been proposed a method of electrochemically oxidizing the nickel hydroxide particles under the presence of alkaline solution, wherein a conductive substrate such as foamed nickel is filled with nickel hydroxide and a conductive additive such as a cobalt compound and is charged and discharged in a condition where it has been immersed in an amount of electrolyte. This method is useful for increasing the capacity of the positive electrode without remaining the oxidizer therein. However, after the conductive substrate filled with the nickel hydroxide and conductive additive was oxidized and reduced, the active material is apt to be removed when the conductive substrate is subjected to a washing process for removal of alkali. For this reason, the manufacturing process of the positive electrode becomes complicated. Additionally, the strength of the conductive substrate is decreased during the charge-discharge process.

Although the capacity of the alkaline cell can be increased by electrochemically oxidizing the nickel hydroxide in a powder condition, electrochemical oxidation of the nickel hydroxide may not be effected in a conventional manner since the conductivity of nickel hydroxide itself is poor. For this reason, the inventors have proposed a method for enhancing the conductivity of nickel hydroxide is disclosed in Japanese Patent Laid-open Publication Nos. 8-148145 and 8-148146. In the method disclosed in Japanese Patent Laid-open Publication Nos. 8-148145 and 8-148146, cobalt hydroxide was precipitated on the surface of nickel hydroxide particles and subjected to heat treatment under the presence of alkaline solution so that the cobalt hydroxide is formed in a higher order state. The cobalt compound formed on the surfaces of nickel hydroxide particles is superior in conductivity and is closely mixed with the nickel hydroxide particles at molecular level to effect smooth transfer of electron in electrochemical reaction. This is useful to provide a high performance storage cell.

In the foregoing methods, however, the nickel hydroxide may not be formed in a higher order state. As a result, the density in volume of nickel hydroxide is small, and an amount of the active material filled in a conductive substrate of a specific volume becomes small in comparison with an amount of an active material of higher density in volume. Accordingly, the capacity of an alkaline storage cell using the active material may not be increased. In case the nickel hydroxide may not be formed in a higher order state, it is required to form a specific amount of discharge reserve on a negative electrode. This results in decrease of utilization factor of the active material in the negative electrode.

SUMMARY OF THE INVENTION

It is, therefore, a primary object of the present invention to provide a nickel hydroxide active material superior in conductivity and of higher density in volume useful for increasing the capacity of an alkaline storage cell and to provide a method of manufacturing the nickel hydroxide active material in a simple manner.

According to the present invention, the object is accomplished by providing a nickel hydroxide active material for use in an alkaline storage cell, the active material being essentially composed of nickel hydroxide particles covered with a cobalt compound adhered to their surfaces, wherein the cobalt compound is disordered in its crystal structure and formed in a higher order state containing alkali cation, and wherein the nickel hydroxide is in the form of a higher order nickel compound of higher density in volume.

In a practical embodiment of the present invention, it is preferable that the average oxidation value of the higher order nickel compound is 2.15 to 2.40, and it is also preferable that the higher order cobalt compound is defined to be 1 wt % to 10 wt % relative to the entire weight of the nickel hydroxide active material.

According to an aspect of the present invention, there is provided a manufacturing method of a nickel hydroxide active material for use in an alkaline storage cell, comprising the steps of adhering a cobalt compound of less than 2 in average oxidation value to nickel hydroxide particles, subjecting the cobalt compound adhered to the nickel hydroxide particles to a heat treatment under the presence of alkaline solution and oxygen so that the cobalt compound is disordered in its crystal structure and formed on the surfaces of the nickel hydroxide particles in a higher order state containing alkali cation, mixing the nickel hydroxide particles subjected to the heat treatment with alkaline solution to produce a slurry, and charging an active material essentially composed of the nickel hydroxide particles in such a manner that the slurry is electrochemically oxidized to form the nickel hydroxide particles in a higher order nickel compound of higher density in volume.

In the manufacturing method described above, it is preferable that an amount of charge current at the step of charging the active material is adjusted in such a manner that the average oxidation value of the higher order nickel compound is adjusted to 2.15 to 2.40, and it is also preferable that the step of adhering a cobalt compound of less than 2 in average oxidation value to nickel hydroxide particles is carried out to precipitate the cobalt compound on the surfaces of the active material essentially composed of the nickel hydroxide particles. The step of adhering a cobalt compound of less than 2 in average oxidation value to nickel hydroxide particles may be carried out by mixing cobalt hydroxide and/or cobalt oxide with the active material essentially composed of the nickel hydroxide particles.

BRIEF DESCRIPTION OF THE DRAWINGS

Other objects, features and advantages of the present invention will be more readily appreciated from the following detailed description of preferred embodiments thereof when taken together with the accompanying drawing in which.

DESCRIPTION OF THE PREFERRED EMBODIMENTS

Embodiment 1

Figure 1:
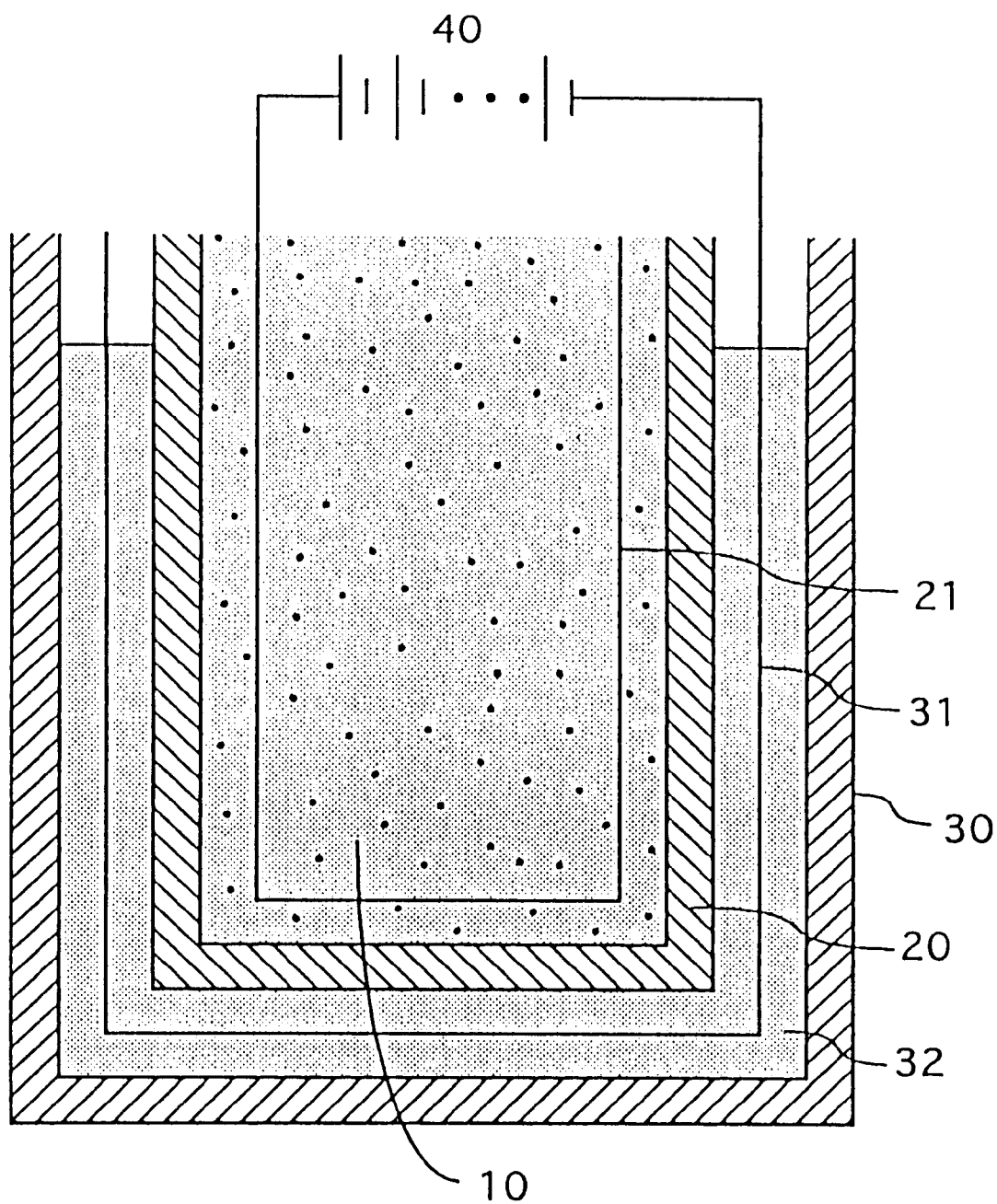
FIG. 1 illustrates, in vertical section, an apparatus for forming nickel hydroxide in a higher order state during a charging process.

While an amount of aqueous solution mixed with nickel sulfate, zinc sulfate and cobalt sulfate at a ratio by weight of 100:3:1 was stirred, an amount of aqueous solution of sodium hydroxide and aqueous solution of ammonia was gradually added so that pH of the reaction solution is maintained at 13–14 to precipitate nickel hydroxide particles. Thereafter, an amount of aqueous solution of cobalt sulfate of specific gravity 1.30 and aqueous solution of 25 weight % sodium hydroxide was added to the solution containing the precipitated nickel hydroxide particles so that pH of the reaction solution is maintained at 9–10 to precipitate cobalt hydroxide (a cobalt compound of less than 2 in average oxidation value) around crystal cores in the form of the precipitated nickel hydroxide particles. The precipitated particles were collected, washed and dried to produce a nickel hydroxide active material of the nickel-zinc-cobalt type in the form of nickel hydroxide particles covered with the cobalt hydroxide. When the cobalt hydroxide was formed on the surface of the nickel hydroxide active material in such a manner as described above, 7 weight % cobalt hydroxide relative to the entirety of the nickel hydroxide active material was produced.

In the nickel hydroxide active material of the nickel-zinc-cobalt type, the surfaces of the nickel hydroxide particles were covered with the cobalt hydroxide precipitated thereon. Although a small amount of molten nickel compound was impregnated in the nickel hydroxide particles prior to addition of alkaline solution composed of the aqueous solution of cobalt sulfate and aqueous solution of sodium hydroxide, the molten nickel compound was precipitated in the nickel hydroxide particles integrally with the cobalt hydroxide by addition of the alkaline solution. As a result, the cobalt hydroxide was formed on the surfaces of the nickel hydroxide as a thick layer and formed in the interior of nickel hydroxide as a thin layer.

The nickel hydroxide particles formed thereon with the cobalt hydroxide was sprayed with alkali solution (35 wt % sodium hydroxide) under heat stream in an oxygen atmosphere. In this instance, the heat temperature of the nickel hydroxide particles was maintained at about 60° C. and risen up to 90° C. after an amount of alkaline solution (35 weight % sodium hydroxide) five times the amount of cobalt was sprayed on the nickel hydroxide particles. During the alkali heat treatment process, the cobalt hydroxide formed on the nickel hydroxide particles was disordered in its crystal structure, while oxidation of the nickel hydroxide was strongly effected to produce a higher order cobalt compound of more than 2 in average oxidation value. As a result, the higher order cobalt compound superior in conductivity was formed on the nickel hydroxide particles.

100 parts by weight of the nickel hydroxide particles covered with the higher order cobalt compound were mixed with 150 parts of alkaline solution (6N potassium hydroxide) to prepare a slurry 10. As shown in FIG. 1, the slurry 10 was filled in a porous container 20 such as an unglazed pottery, and a positive nickel electrode 21 was inserted into the porous container 20. On the other hand, a negative nickel electrode 31 was inserted in a cylindrical cell vessel 30 filled with an amount of alkaline solution (6N potassium hydroxide). Thus, the porous container 20 was immersed in the alkaline solution 32 in the cell vessel 30. To apply a DC voltage between the electrodes 21 and 31, the positive nickel electrode 21 was connected to a positive terminal of a direct current power source 40, while the negative nickel electrode 31 was connected to a negative terminal of the power source 40. Since it is required to apply a charge amount of about 230 mAh per 1 g of the nickel hydroxide active material for full charge of the active material, a current of about 600 mA was applied to the nickel hydroxide particles of 100 g for a predetermined time during which the nickel hydroxide was oxidized at the positive side and converted into a higher order nickel compound of 2, 3 in oxidation value, while the alkaline solution 32 was electrolyzed at the negative side to generate hydrogen. The nickel hydroxide particles in the form of the higher order nickel compound was washed by pure water and dried to produce a positive electrode active material which is referred to an active material A1 hereinafter. In the case that the nickel hydroxide particles were constantly applied with the charging current of 800 mA, the average oxidation value of the higher order nickel compound produced at the positive electrode was represented in relation to the charging time in the following Table 1.

TABLE 1

| Charging time | Average oxidation value |
| --- | --- |
| 10 | 2.25 |
| 12 | 2.30 |
| 15 | 2.38 |
| 20 | 2.47 |

In Table 1, the average oxidation value was measured by oxidation-reduction titration after substituted residual nickel of oxidation value 2 with iron ion. That is to say, the active material was substituted with iron after dissolved in acetic acid solution and calculated by oxidation-reduction titration with potassium permanganate. The measurement result can be obtained even if the charge current is changed in a condition where the charging time is constant. In brief, the average oxidation value of the higher order nickel compound becomes large in accordance with an increase of the charge amount of electricity.

Embodiment 2

While an amount of aqueous solution mixed with nickel sulfate, zinc sulfate and cobalt sulfate at a ratio by weight of 100:3:1 was stirred, an amount of aqueous solution of sodium hydroxide and aqueous solution of ammonia was gradually added so that pH of the reaction solution is maintained at 13–14 to precipitate nickel hydroxide particles. Thereafter, the reaction solution was filtrated, washed and dried to obtain nickel hydroxide particles of the nickel-zinc-cobalt type. The nickel hydroxide particles were mixed with 7 wt % cobalt hydroxide and/or cobalt oxide and stirred to adhere the cobalt hydroxide and/or cobalt oxide to the nickel hydroxide particles.

The cobalt hydroxide and/or cobalt oxide adhered to the nickel hydroxide particles was sprayed with alkaline solution (35 weight % sodium hydroxide) under heat stream in an oxygen atmosphere. In this instance, the temperature of nickel hydroxide was maintained at about 60° C. and risen up to 90° C. after an amount of alkaline solution (35 weight % sodium hydroxide) five times the amount of cobalt was sprayed on the cobalt hydroxide and/or cobalt oxide.

During the alkali heat treatment described above, a cobalt hydroxide layer was formed on the nickel hydroxide particles by cobalt dissolved in the alkaline solution. The cobalt hydroxide layer was disordered by heat in its crystal structure, and oxidation of the cobalt hydroxide was strongly effected to produce a higher order cobalt compound of more than 2 in average oxidation value. Thus, the higher order cobalt compound superior in conductivity was formed on the nickel hydroxide particles. In this instance, 7% by weight of cobalt compound was formed on the entirety of the nickel hydroxide active material.

As well as in the embodiment 1, 100 parts by weight of the nickel hydroxide particles were mixed with 150 parts by weight of alkaline solution (6N potassium hydroxide) to prepare a slurry 10. As shown in FIG. 1, the slurry was filled in the porous container 20, and a positive nickel electrode 21 was placed in position in the porous container 20. On the other hand, a negative nickel electrode 31 was placed in position in the cell vessel 30 filled with alkaline solution 32 (6N potassium hydroxide). Thus, the porous container 20 was immersed in the alkaline solution 32 in cell vessel 30. To apply a DC current between the nickel electrodes 21 and 31, the positive nickel electrode 21 was connected to the positive terminal of the direct current power source 40, while the negative nickel electrode 31 was connected to the negative terminal of power source 40. In such a condition, a current of about 600 mAh was applied to the nickel hydroxide particles of 100 g for a predetermined time during which the nickel hydroxide was oxidized at the positive side and converted into a higher order nickel compound of 2, 3 in oxidation value, while the alkali aqueous solution 32 was electrolyzed at the negative side to generate hydrogen. The nickel hydroxide particles in the form of the higher order nickel compound was washed by pure water and dried to produce a positive electrode active material referred to an active material A2 hereinafter. In the case that the nickel hydroxide particles were constantly applied with the charging current of 600 mA, the average oxidation value of the higher order nickel compound produced at the positive electrode was represented in relation to the charging time as shown in Table 1.

Comparative Example 1

While an amount of aqueous solution mixed with nickel sulfate, zinc sulfate and cobalt sulfate at a ratio by weight of 100:3:1 was stirred, an amount of aqueous solution of sodium hydroxide and aqueous solution of ammonia was gradually added so that pH of the reaction solution is maintained at 13–14 to precipitate nickel hydroxide particles. Thereafter, the reaction solution was filtrated, washed and dried to obtain nickel hydroxide particles of the nickel-zinc-cobalt type. The nickel hydroxide particles were mixed with 7% by weight of cobalt oxide and stirred to obtain the nickel hydroxide particles added with the cobalt oxide as an active material B1 in the comparative example 1.

Comparative Example 2

While an amount of aqueous solution mixed with nickel sulfate, zinc sulfate and cobalt sulfate at a ratio by weight of 100:3:1 was stirred, an amount of aqueous solution of sodium hydroxide and aqueous solution of ammonia was gradually added so that pH of the reaction solution is maintained at 13–14 to precipitate nickel hydroxide particles. Thereafter, aqueous solution of cobalt sulfate of specific gravity 1.30 and 25% by weight of sodium hydroxide were added to a solution containing the precipitated hydroxide particles in such a manner that pH of the reaction solution is maintained at 9–10 to precipitate cobalt hydroxide of less than 2 in average oxidation value around the precipitated nickel hydroxide particles. Thus, the precipitated particles were collected, washed and dried to obtain an active material of the nickel-zinc-cobalt type in the form of nickel hydroxide particles formed thereon with cobalt hydroxide (7% by weight of cobalt hydroxide in relation to the active material).

The cobalt hydroxide formed on the nickel hydroxide particles was sprayed with alkaline solution (35 wt % sodium hydroxide) under heat stream in an oxygen atmosphere. In this instance, the temperature of the nickel hydroxide particles was maintained at about 60° C. and risen up to 90° C. after an amount of alkaline solution (35 wt % sodium hydroxide) five times the amount of cobalt was sprayed on the nickel hydroxide particles. Thus, the nickel hydroxide particles covered with a higher order cobalt compound superior in conductivity were obtained as an active material B2 in the comparative example 2.

Comparative Example 3

The nickel hydroxide particles of 100 g obtained in the comparative sample 2 were left in 3N sodium hypochlorite of 500 ml for about three hours (for adjusting the oxidation value of nickel to about 2.3) so that the nickel hydroxide is oxidized and produced as a higher order nickel compound of 2.3 in oxidation value. The higher order nickel compound was sufficiently washed by pure water and obtained as an active material B3 in the comparative example 3.

Comparative Example 4

While an amount of aqueous solution mixed with nickel sulfate, zinc sulfate and cobalt sulfate at a ratio by weight of 100:3:1 was stirred, an amount of aqueous solution of sodium hydroxide and aqueous solution of ammonia was gradually added so that pH of the reaction solution is maintained at 13–14 to precipitate nickel hydroxide particles. Thereafter, the reaction solution containing the precipitated nickel hydroxide particles was filtrated, washes and dried to obtain nickel hydroxide particles of the nickel-zinc-cobalt type. The nickel hydroxide particles of 100 g was left in 3N sodium hypochlorite of 500 ml for about three hours (for adjusting the oxidation value of nickel to about 2.3) so that the nickel hydroxide is oxidized and obtained as a higher order nickel compound of about 2.3 in oxidation value. The higher order nickel compound was sufficiently washed by pure water and mixed with 7 wt % cobalt oxide to obtain the nickel hydroxide particles added with the cobalt oxide as an active material B4 in the comparative example 4.

Measurement of density of the active materials

Each density of the nickel hydroxide active materials produced in the foregoing embodiments 1, 2 and comparative examples 1 to 4 was measured as shown in the following Table 2. The measurement of each density of the active materials were carried out as follows. The active materials each were measured out by 10 g and tapped two hundred times by using a measuring cylinder of 100 cc to calculate each mass of the active materials per 1 cc. In Table 2, the density of the active material of the comparative example 3 is represented as 100 for comparison with each density of the other active materials.

TABLE 2

| Active material | Oxidation value of nickel | Density |
|---|---|---|
| A1 | 2.3 | 109 |
| A2 | 2.3 | 109 |
| B1 | 2.0 | 103 |
| B2 | 2.0 | 105 |
| B3 | 2.3 | 100 |
| B4 | 2.3 | 98 |

As is understood from Table 2, each density of the active materials in the embodiments 1 and 2 was increased more than that of the comparative examples 1 to 4 for the following reason. In general, the density of nickel hydroxide of 3 in oxidation value (oxy-nickel hydroxide) is larger than that of nickel hydroxide of 2 in oxidation value, and the density of nickel hydroxide is increased in accordance with an increase of the oxidation value. Since a cobalt compound of 2 in oxidation value (cobalt hydroxide or cobalt oxide) is relatively large in volume, the density of the active materials composed of the cobalt compound and nickel hydroxide becomes smaller as in the comparative examples 1 and 4. It is, therefore, believed that the density of each of the active materials formed without the cobalt compound as in the embodiment 1 and 2 is increased. In addition, taking into account the fact that each density of the active materials in the comparative examples 3 and 4 is smaller than that of the active materials in the comparative examples 1 and 2, it is believed that a large amount of γ-type oxy-nickel hydroxide of lower density in volume was produced.

Manufacture of Nickel Electrode 100 parts by weight of each of the active materials in the foregoing embodiments 1, 2 and comparative examples 1 to 4 were mixed with 50 parts by weight of aqueous solution of 0.2 wt % hydroxypropyl cellulose to produce an active material slurry. The active material slurry was filled in a substrate composed of foamed nickel of thickness 1.6 mm and of porosity 95% and dried after immersed in aqueous solution of polytetrafluoroethylene. Thereafter, the substrate was rolled in thickness of 0.60 mm to produce a non-sintered type nickel positive electrode.

Experiment of Single Electrode
1) Utilization factor of Active Material

The non-sintered type nickel positive electrode produced in such a manner as described above was cut into a predetermined shape in such a manner as to contain therein the nickel hydroxide active material of 1 g. The positive electrode and a nickel electrode opposed thereto were contained in an open type cell vessel filled with electrolyte of 25% by weight of potassium hydroxide to produce an open type simplified cell. For measurement of utilization factors of the active materials, the open type simplified cell was charged at a charge current of 0.1 C (120 mA) for 24 hours. Thereafter, the discharge capacity of the cell was measured by discharging the cell at ⅓ C (400 mA) until the final discharge voltage becomes −0.8 V against the nickel electrode. After measurement of the discharge capacity, the active material was removed from the positive electrode to calculate an amount of the active material thereby to calculate the discharge capacity per 1 g of the active material. Thus, a utilization factor of the active material was calculated on a basis of a ratio of the discharge capacity to the theoretical discharge capacity as shown in the following equation.

$$\text{Utilization factor} = \frac{\text{Discharge capacity}}{\text{Theoretical discharge capacity}} \times 100 \ (\%)$$

The theoretical discharge capacity was calculated as 289 mAh per 1 g of nickel hydroxide in terms of only the nickel hydroxide without containing any cobalt compound.

2) Swelling of Electrode

The simplified cell was continuously discharged at a discharge current of 0.05 C at a room temperature of 0° C. for 48 hours. After continuous discharge of the cell, an X-ray diffraction test of the active material was carried out to measure a production ratio in amount of γ-type nickel hydroxide and β-type nickel hydroxide. The production ratio was represented as an indication of swelling of the electrode in the following Table 3. In view of the definition of the swelling, a nickel electrode desirable in use was represented by a small value of the swelling.

TABLE 3

| Active material | Oxidation Value | Density | Utilization factor | Swelling | Capacity per unit volume |
|---|---|---|---|---|---|
| A1 | 2.3 | 109 | 1.01 | 81 | 110 |
| A2 | 2.3 | 109 | 1.01 | 82 | 110 |
| B1 | 2.0 | 103 | 0.95 | 79 | 98 |
| B2 | 2.0 | 105 | 0.99 | 80 | 104 |
| B3 | 2.3 | 100 | 1.01 | 100 | 101 |
| B4 | 2.3 | 98 | 1.01 | 98 | 99 |

In Table 3, the swelling of the electrode using the active material in the comparative example 3 is represented as 100 for comparison with the swelling of the other electrodes, and the capacity per unit volume was obtained by multiplication of the density of the active material and the utilization factor.

As is understood from Table 3, the utilization factor of the active material in the electrode using the active material B1 in the comparative example 1 was small, while each utilization factor of the active material in the electrodes using the other active materials was approximately the same. In addition, the capacity per unit volume of each of the electrodes using the active material A1, A2 in the embodiments 1 and 2 was large, while the capacity per unit volume of each of the electrodes using the active materials B1 to B4 in the comparative examples 1 to 4 was small. That is to say, the utilization factor of the active material and capacity per unit volume in the electrode using the active material B1 produced in the comparative example 1 without forming any higher order cobalt compound became smallest, and the capacity per unit volume of the electrode using the active material B2 produced in the comparative example 2 without forming the nickel hydroxide in a higher order state was decreased. Similarly, the capacity per unit volume of the electrode using the active material B3 or B4 produced in the comparative example 3 to 4 without electrochemically forming the nickel hydroxide in a higher order state was also decreased.

In the measurement of swelling of the electrode, it has been found that the swelling of the electrode using the active material B3 or B4 chemically oxidized by the oxidizer in the comparative example 3 and 4 without electrochemically forming the nickel hydroxide in a higher order state was inferior in comparison with the swelling of the other electrodes. From this fact, it is believed that a large amount of γ type oxy-nickel hydroxide is produced in the active materials B3 and B4 produced in the comparative examples 3 and 4.

Production of Negative Electrode

Misch metal (Mm: a mixture of rare earth elements). Nickel, cobalt, aluminum and manganese were mixed at a ratio of 1:3.6:0.6:0.2:0.6. The mixture was heated in a high frequency induction furnace of argon gas atmosphere and cooled in a well-known manner so that an ingot of hydrogen-absorbing alloy represented by composition formula $Mm_{1.0}Ni_{3.6}Co_{0.6}Al_{0.2}Mn_{0.6}$ is produced. The ingot of hydrogen-absorbing alloy was mechanically pulverized into hydrogen-absorbing alloy powder in average particle size of about 100 micron. The hydrogen-absorbing alloy powder was mixed with a binder such as polyethylene oxide and a small amount of water to produce hydrogen-absorbing alloy paste. The paste was coated on a punched sheet metal, dried and rolled under pressure in thickness of about 0.4 mm to produce a negative electrode of hydrogen-absorbing alloy.

Production of Nickel-hydrogen Storage Cell

The non-sintered type positive electrode (cut into the predetermined size containing 5 g of the nickel hydroxide active material) and the negative electrode of hydrogen-absorbing alloy were stacked through a separator made of a unwoven polypropylene fiber, rolled up and inserted into a cylindrical cell vessel into which aqueous solution of potassium hydroxide was injected. Thereafter, the cell vessel was sealed to produce a nickel-hydrogen storage cell of AA size and nominal capacity 1200 mAh.

Experiment of over-discharge characteristic

The over-discharge characteristic of each of the nickel-hydrogen storage cells produced in such a manner as described above was measured by the following steps.

1) The cell was charged at a current of 1200 mA. When the cell voltage dropped 10 mV after increased up to a maximum value, the charging was stopped and suspended for one hour.

2) After stopping for one hour, the cell was discharged at a current of 1200 mA until the cell voltage becomes 1 V. At this stage, the discharge capacity X of the cell was calculated from the discharging time.

3) After discharge at the current of 1200 mA, the cell was forcibly discharged at a current of 60 mA for sixteen hours.

4) The cell was charged again at the current of 1200 mA. When the cell voltage dropped 10 mV after increased up to the maximum value, the charging was stopped and suspended for one hour.

5) After lapse of one hour, the cell was discharged at the current of 1200 mA until the cell voltage becomes 1 V.

6) After discharge at the current of 1200 mA, the cell was forcibly discharged at the current of 60 mA for sixteen hours.

7) After the charge-discharge cycle at the above steps 4) to 6) was repeated nine times, the charge cycle at the above steps 4) and 5) was repeated five times. Thus, the discharge capacity Y of the cell after over-discharge was measured on a basis of the final discharging time at the step 5).

Based on the discharge capacities X, Y measured as described above, a recovery rate of capacity Z after over-discharge was calculated by an equation "$Z=(Y/X)\times 100$ (%)". A result of the measurement is shown in the following Table 4 wherein the recovery rate of capacity of the nickel-hydrogen storage cell using the active material of the comparative example is represented as 100 for comprisong with the recovery rate of capacity of the other storage cells.

TABLE 4

| Active material | Oxidation value of nickel | Recovery rate of capacity |
|---|---|---|
| A1 | 2.3 | 119 |
| A2 | 2.3 | 119 |
| B1 | 2.0 | 100 |
| B2 | 2.0 | 120 |
| B3 | 2.3 | 100 |
| B4 | 2.3 | 98 |

As is understood from Table 4, it has been found that the recovery rate of capacity of the nickel-hydrogen storage cell using either one of the active materials in the embodiment 1, 2 and comparative example 2 is increased. From this fact, it is believed that although the recovery rate of capacity of the nickel-hydrogen storage cell using the nickel hydroxide active material formed thereon with the higher order cobalt compound as in the embodiments 1, 2 and comparative example 2 is increased, the recovery rate of capacity of the storage cell using the nickel hydroxide oxidized by the oxidizer in the higher order state as in the comparative example 3 is decreased due to production of a large amount of γ-type oxy-nickel hydroxide caused by chemical oxidation of the nickel hydroxide.

Cycle characteristic

A relationship between oxidation value of nickel and cycle characteristic of the nickel-hydrogen storage cell using the nickel hydroxide active material in the embodiment 1 was evaluated as follows:

The active material of 2.30 in average oxidation value charged for twelve hours during the charging process in the embodiment 1 was referred to an active material A), the active material of 2.40 in average oxidation value charged for sixteen hours was referred to an active material B), and the active material of 2.45 in average oxidation value charged for nineteen hours was referred to an active material C). The active materials A), B) and C) each were used to produce a positive nickel electrode in the same manner as described above, Thus, a nickel-hydrogen storage cell using the positive nickel electrode and the negative electrode of hydrogen-absorbing alloy (having a discharge capacity two times the positive nickel electrode) was produced in the same manner as described above.

The discharge characteristics of the nickel-hydrogen storage cells were measured by the following steps.

1) The cell was charged at a current of 1200 mA. When the cell voltage dropped 10 mV after increased up to a maximum value, the charging was stopped.

2) The charging was suspended for one hour.

3) After lapse of one hour, the cell was discharged at a current of 1200 mA until the cell voltage becomes 1V.

4) The discharge of the cell was suspended for one hour.

5) The charge-disclosure cycle at the steps 1) to 4) was repeated one hundred times.

Thus, a ratio in amount of discharge current α at the first cycle to discharge current β at the one hundred cycle was measured to evaluate each cycle characteristic of the active material A), B) and C). A result of the evaluation is shown in the following Table 5, wherein the cycle characteristic of the nickel-hydrogen storage cell using the active material A is defined as 100.

TABLE 5

| Active material | Oxidation value of nickel | Cycle characteristic |
|---|---|---|
| A) | 2.30 | 100 |
| B) | 2.40 | 100 |
| C) | 2.45 | 53 |

As is understood from Table 5, it has been found that the ratio in amount of discharge current of the nickel-hydrogen storage cell using the active material C) is extremely decreased. This is caused by the fact that if the oxidation value is increased more than 2.4 the capacity of the negative electrode is decreased at the end of discharge of the cell, resulting in a decrease of the discharge capacity of the cell. It is, therefore, desirable that an appropriate amount of capacity of the negative electrode is maintained at the end of discharge of the positive electrode to stabilize the electric potential of the negative electrode in the storage cell. In general, the capacity remained in the negative electrode is called "discharge reserve". Thus, in a condition where the negative electrode is not preliminary charged as in the present invention, it is desirable that the average oxidation value of the nickel hydroxide active material for the positive electrode is determined to be less than 2.4 thereby to ensure the discharge reserve. On the contrary, if the average oxidation value of the nickel hydroxide active material for the positive electrode is less than 2.15, effects for enhancing the density of the active material and for reducing the discharge reserve may not be obtained. For the above reasons, it is desirable that the average oxidation value of the nickel hydroxide active material is determined to be in an extent of 2.15 to 2.4.

Although in the embodiments 1 and 2, the oxidation value of nickel has been adjusted by a charge amount of electricity during the process for electrochemically oxidizing the nickel hydroxide, oxy-nickel hydroxide of about 3 in oxidation value may be mixed with nickel hydroxide to adjust the average oxidation value of the active material to 2.15 to 2.40.

Evaluation of the amount of cobalt

A relationship between the oxidation value of nickel and the cycle characteristic in the nickel-hydrogen storage cell using the nickel hydroxide active material produced in the embodiment 1 was evaluated as follows.

While an amount of aqueous solution mixed with nickel sulfate, zinc sulfate and cobalt sulfate at a ratio by weight of 100:3:1 was stirred, an amount of aqueous solution of sodium hydroxide and aqueous solution of ammonia was gradually added so that pH of the reaction solution is maintained at 13–14 to precipitate nickel hydroxide particles. Thereafter, an amount of aqueous solution of cobalt sulfate of specific gravity 1.30 and aqueous solution of 25 wt % sodium hydroxide was added to the solution containing the precipitated nickel hydroxide particles so that pH of the reaction solution is maintained at 9–10 to precipitate cobalt hydroxide around crystal cores in the form of the precipitated nickel hydroxide particles. At this stage, the amount of the aqueous solution of cobalt sulfate was adjusted to precipitate the cobalt hydroxide respectively at 0.7 wt %, 1.0 wt %, 3.0 wt %, 7.0 wt %, 10.0 wt % and 11.0 wt % relative to the nickel hydroxide active material.

The precipitated particles were collected, washed by water and dried to produce nickel hydroxide active materials D, E, F, G, H, I of the nickel-zinc-cobalt type covered with the cobalt hydroxide in particle form respectively at 0.7 wt %, 1.0 wt %, 3.0 wt %, 7.0 wt %, 10.0 wt % and 11 wt % relative to the nickel hydroxide active materials. Thus, the nickel hydroxide active materials were subjected to the alkali treatment and the charging treatment as in the embodiment 1 and used to produce non-sintered nickel positive electrodes in the same manner as described above. The non-sintered nickel positive electrode each were cut into a predetermined shape in such manner as to contain therein the nickel hydroxide active material of 1 g. Each of the positive electrodes and a nickel plate opposed thereto were contained in an open type cell vessel filled with electrolyte of 25% by weight of potassium hydroxide to produce an open type simplified cell.

The simplified cell was charged at a charge current of 0.1 C (120 mA) for 24 hours and discharged at a discharge current of ⅓ C (400 mA) until the final discharge voltage becomes −0.8 V against the nickel electrode. Thereafter, the active material was removed from the positive electrode to calculate an amount of the active material thereby to calculate the discharge capacity per 1 g of the active material as a capacity per unit active material. A result of the measurement is shown in the following Table 6 wherein the discharge capacity of the positive electrode using the active material F (containing 3.0 wt % cobalt) is represented as 100 for comparison with each discharge capacity of the other positive electrodes.

TABLE 6

| Active material | Oxidation value | Amount of cobalt | Capacity per unit active material |
|---|---|---|---|
| D | 2.30 | 0.7 | 93 |
| E | 2.30 | 1.0 | 99 |
| F | 2.30 | 3.0 | 100 |
| G | 2.30 | 7.0 | 101 |
| H | 2.30 | 10.0 | 100 |
| I | 2.30 | 11.0 | 95 |

As is understood from Table 6, it has been found that the capacity per unit active material decreased regardlessly of the amount of cobalt for the following reason. If the amount of cobalt is less than 1.0 wt %, a conductive network formed in the active material becomes insufficient. As a result, the active material may not be reduced in its entirety during discharge of the cell, resulting in decrease of the capacity per unit active material. If the amount of cobalt is more than 10.0 wt %, the conductive network formed in the active material becomes sufficient. However, the amount of nickel hydroxide active material effective in electrochemical reaction decreases relatively to the amount of cobalt ineffective in electrochemical reaction, resulting in decrease of the capacity per unit active material. It is, therefore, desirable that the amount of cobalt relative to the entirety of the active material is determined to be 1.0 to 10.0 wt %.

What is claimed is:

1. A nickel hydroxide active material for use in an alkaline storage cell, the active material being essentially composed of nickel hydroxide particles covered with a cobalt compound adhered to their surfaces, wherein the cobalt compound has a disordered crystal structure and is formed on the surfaces of the nickel hydroxide particles in an average oxidation value of more than 2 and contains alkali cation, and wherein the nickel hydroxide particles are in the form of a higher order nickel compound having an average oxidation value of 2.15 to 2.40.

2. The nickel hydroxide active material as claimed in claim 1, wherein the cobalt compound is present in an amount of 1 wt % to 10 wt % relative to the entire weight of the nickel hydroxide active material.

3. A method of manufacturing a nickel hydroxide active material for use in an alkaline storage cell, said method comprising the steps of:

(a) adhering a cobalt compound of equal to or less than 2 in average oxidation value to nickel hydroxide particles;

(b) subjecting the cobalt compound adhered to the nickel hydroxide particles to heat treatment in the presence of an alkaline solution and oxygen so that the cobalt compound formed on the nickel hydroxide particles is disordered in crystal structure and contains alkali cations;

(c) mixing the prepared nickel hydroxide particles subjected to heat treatment in step (b) with an alkaline solution to produce a slurry; and (d) charging an active material essentially composed of the treated nickel hydroxide particles in such a manner that the slurry is electrochemically oxidized to convert the treated nickel hydroxide particles to a higher order nickel compound having an average oxidation value of 2.15 to 2.40.

4. The method as claimed in claim 3, wherein step (a) precipitates the cobalt compound on the surfaces of the nickel hydroxide particles.

5. The method as claimed in claim 3, wherein step (a) includes mixing cobalt hydroxide and/or cobalt oxide with the nickel hydroxide particles.

6. The method as claimed in claim 3, wherein the cobalt compound is present in an amount of 1 wt % to 10 wt % relative to the entire weight of the nickel hydroxide active material.

* * * * *